United States Patent [19]
Yamamoto et al.

[11] Patent Number: 5,121,323
[45] Date of Patent: Jun. 9, 1992

[54] AUTOMATIC VEHICLE SPEED CONTROL DEVICE

[75] Inventors: Isao Yamamoto; Kouichi Suzuki; Eisaku Hori; Toshio Iwaoka, all of Yokohama, Japan

[73] Assignees: Nissan Motor Co., Ltd.; Jidosha Denki Kogyo K.K., both of Kanagawa, Japan

[21] Appl. No.: 529,410

[22] Filed: May 29, 1990

[30] Foreign Application Priority Data

May 30, 1989 [JP] Japan .................................. 1-136618

[51] Int. Cl.$^5$ ............................................ B60K 31/04
[52] U.S. Cl. ........................... 364/426.04; 364/431.07; 123/350; 180/179
[58] Field of Search ....................... 180/178, 179, 170; 364/426.04, 431.07; 123/349, 350

[56] References Cited

U.S. PATENT DOCUMENTS

| | | | |
|---|---|---|---|
| 4,725,969 | 3/1988 | Onogi et al. | 364/426.04 X |
| 4,735,273 | 4/1988 | Naito | 364/431.07 X |
| 4,829,438 | 5/1989 | Etoh | 364/426.04 |
| 4,858,135 | 8/1989 | Clish et al. | 180/179 X |
| 4,870,583 | 9/1989 | Takahashi et al. | 364/426.04 |
| 4,905,153 | 2/1990 | Suzuki et al. | 364/426.04 |
| 4,926,334 | 5/1990 | Suzuki et al. | 180/179 X |
| 4,928,780 | 5/1990 | Tada | 180/179 |
| 4,931,939 | 6/1990 | Kawata et al. | 364/426.04 |
| 4,943,923 | 7/1990 | Naito | 180/179 X |
| 5,031,715 | 7/1991 | Ogawa et al. | 364/431.07 X |

Primary Examiner—Parshotam S. Lall
Assistant Examiner—Thomas S. Auchterlonie
Attorney, Agent, or Firm—Sughrue, Mion, Zinn, Macpeak & Seas

[57] ABSTRACT

An automatic vehicle speed control device for use in an automatic controlling of the running speed of a vehicle to a certain set speed is disclosed. The device comprises a vehicle speed sensor for outputting vehicle speed data proportional to an actual vehicle speed, a command switch for outputting cruise command signals, an actuator for driving a throttle valve, a vehicle speed memory for memorizing the vehicle speed sensor data in accordance wth operation of the command switch, a decision device for deciding whether or not the decelerating control amount transmitted to the actuator is less than a given amount and the decelerating control time is continuing longer than the given time thereof during vehicle speed controlling, a setting device for setting a response constant W of the actuator larger by an offset value X is case where the decelerating control amount transmitted to the actuator is less than a given amount and the decelerating control time is continuing longer than the given time thereof in the decision device, and a control device for controlling an actuator by calculating the output time Y of an actuator driving signal on the basis of the difference between the actual vehicle speed and the memorized vehicle speed and calculating an actuator driving time TV in accordance with following relation $TV = Y + W$ with the response constant W of actuator set by the setting device.

8 Claims, 5 Drawing Sheets

THROTTLE ACTUATOR

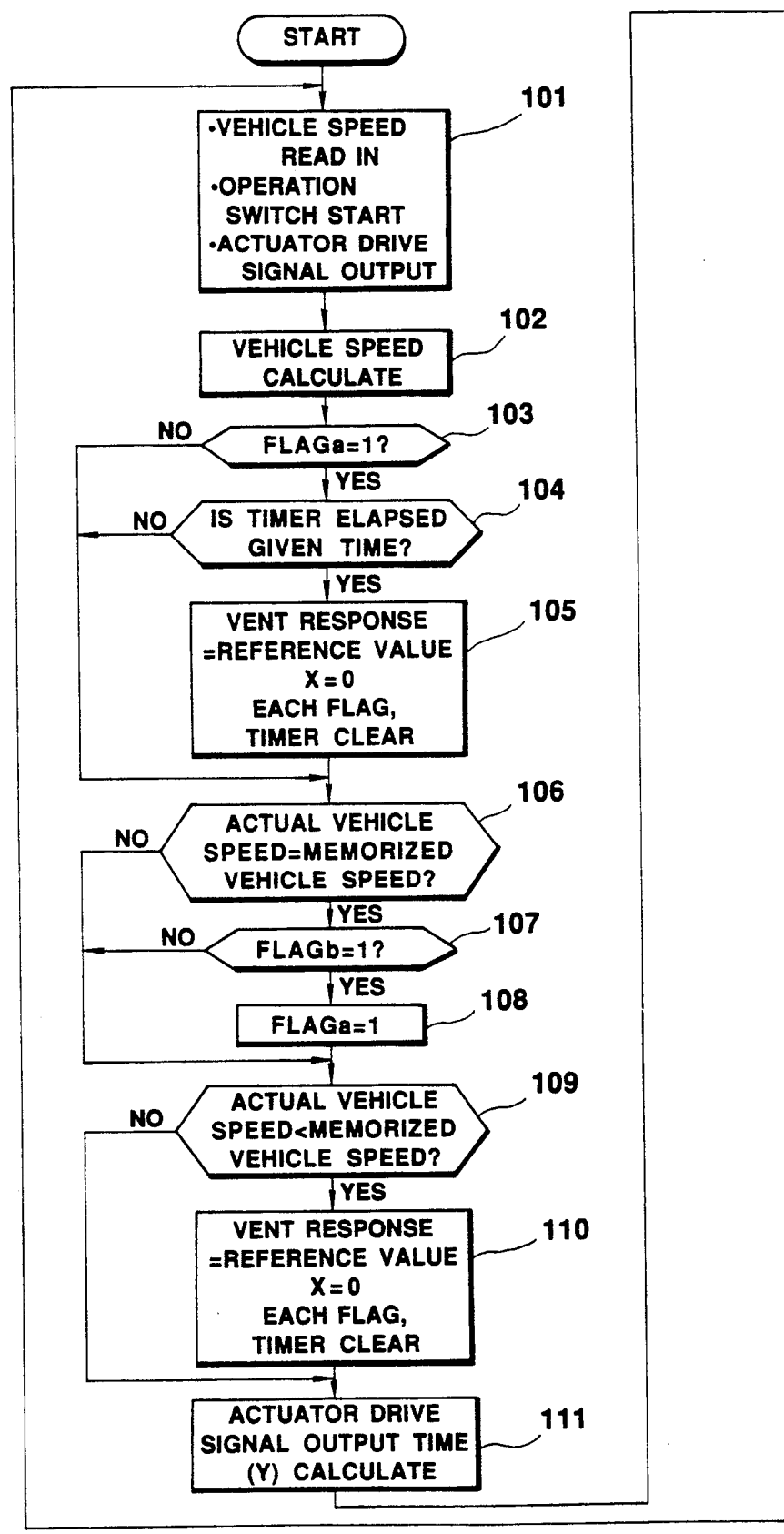

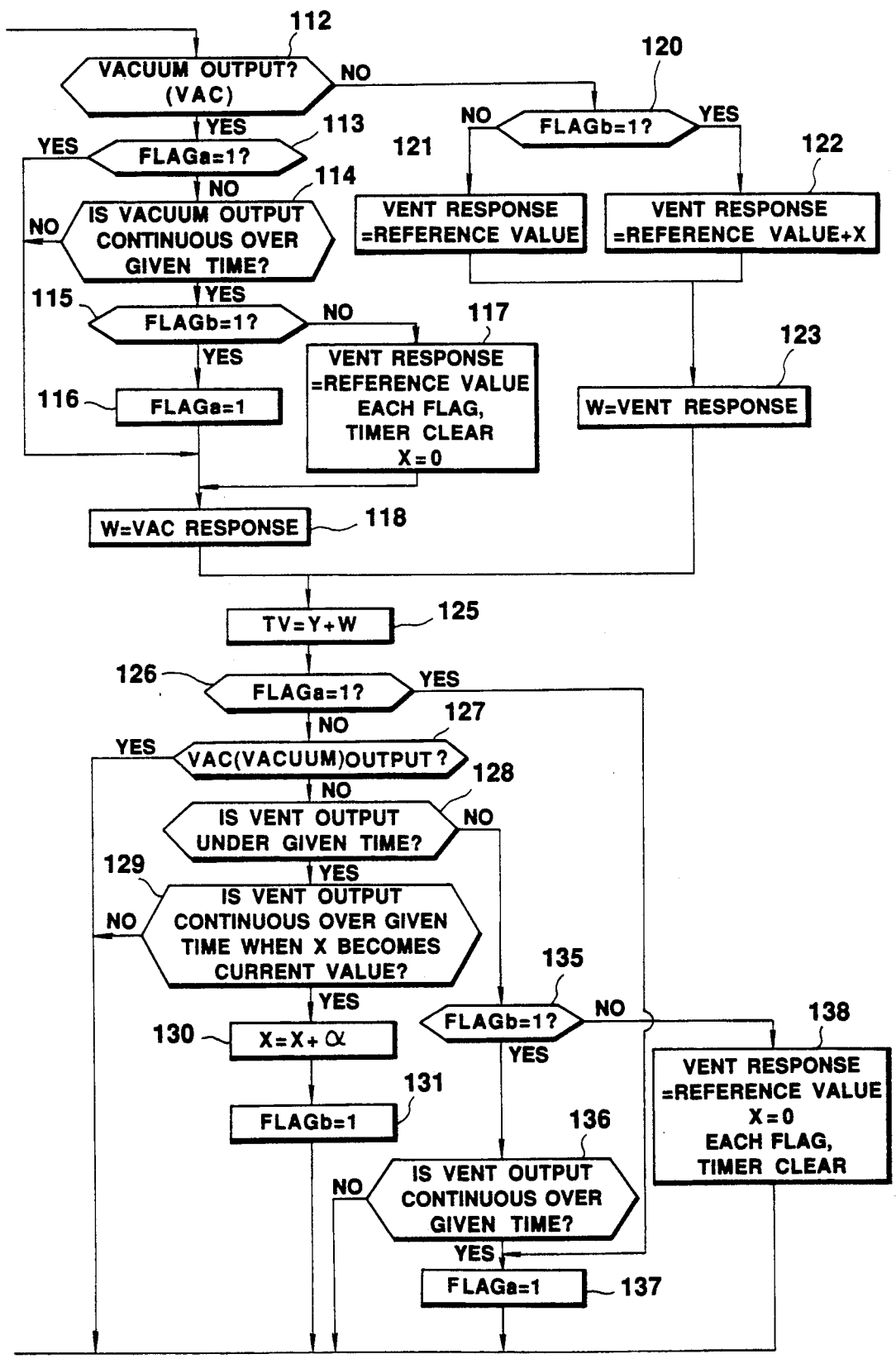

AUTOMATIC VEHICLE SPEED CONTROL DEVICE

BACKGROUND OF THE INVENTION

The present invention relates to an automatic vehicle speed control device for use in automatic controlling the running speed of vehicle to a certain set speed.

As such an automatic vehicle speed control device, various constructions thereof are developed. For example, such an automatic vehicle speed control device comprises a vehicle speed sensor for outputting vehicle speed data proportional to an actual vehicle speed, a command switch for outputting cruise command signals, an actuator for driving a throttle valve, a vehicle speed memory means for memorizing the vehicle speed sensor data in accordance with operation of the command switch, a decision means for deciding whether or not the actual vehicle speed is within ± i km/h of the memorized vehicle speed during vehicle speed controlling, a setting means for setting a response constant G of the actuator at the time of transient response and for setting a response constant G−x of the actuator during a constant speed running by the decided result of the decision means, and a control means for controlling the actuator on the basis of a difference between the actual vehicle speed and the memorized vehicle speed with the response constant G or G−x of the actuator set by the setting means (See Japanese Patent Laid-open No. 205,828/87).

In the above, automatic vehicle speed control device, the command switch is subjected to its OFF operation after its ON operation, the vehicle speed at the OFF operation is memorized in the vehicle speed memory means (the vehicle speed at ON operation may also be memorized), a control signal is applied to the actuator by the control means in response to the difference between the actual vehicle speed and the memorized vehicle speed, and the throttle valve is driven by the action of the actuator in such a manner that the actual vehicle speed is made correspondent to the memorized vehicle speed, thereby effecting the constant speed running. When the actual vehicle speed exceeds in a range of ± i km/h the memorized vehicle speed during the constant speed running, the decision means decides this state, the setting means sets the response constant G of the actuator at the time of transient resoponse, and the control means supplies the control signal to the actuator, thereby adjusting the actual vehicle speed at the time of transient to the memorized vehicle speed quickly. Moreover, when the actual vehicle speed is within a range of ± i km/h of the memorized vehicle speed, this condition is decided by the decision means, the setting means sets the response constant G−x of the actuator at the time of constant speed running, the control means supplies a control signal to the actuator, thereby preventing the throttle valve from being adjusted than necessary, even when the actual vehicle speed is increased or decreased by external factor at the time of constant speed running.

In the above conventional automatic vehicle speed control device, some differences in performance of the actuator may arise due to the scattering in manufacture of the actuator, so that until now, the response constant G−x of the actuator at constant speed running has been set on the basis of lower limit of tolerance in manufacture. When the actuator is used by setting it at upper limit of tolerance in manufacture, and when the response time of the actuator is changed with temperature variation, however, the actual vehicle speed at the constant speed running becomes stable at higher speed than the memorized vehicle speed by about 1∼2 km/h, and it often occurs that the actual vehicle speed does not correspond with the memorized vehicle speed, even with minimal adjustment of speed by deceleration control.

SUMMARY OF THE INVENTION

It is an object of the present invention to eliminate the above described disadvantages of the conventional automatic vehicle speed control device.

It is another object of the present invention to provide an automatic vehicle speed control device in which the actual vehicle speed may quickly correspond with the memorized vehicle speed without being effected by the difference in performance of the actuator at minimal adjustment of vehicle speed at deceleration control.

According to the present invention, an automatic vehicle speed control device comprising a vehicle speed sensor for outputting vehicle speed data proportional to an actual vehicle speed, a command switch for outputting cruise command singnals, an actuator for driving a throttle valve, a vehicle speed memory means for memorizing the vehicle speed sensor in accordance with operation of the command switch, a decision means for deciding whether or not the decelerating control amount to the actuator is less than a given amount and the decelerating control time is continuous more than the given time thereof during vehicle speed controlling, a setting means for setting a response constant W of the actuator larger by a given value X in case where the decision means decides that the decelerating control amount to the actuator is less than a given amount and the decelerating control time is continuing longer than the given time thereof, and a control means for controlling an actuator by calculating an output time Y of an actuator driving signal in accordance with the difference between the actual vehicle speed and the memorized vehicle speed, and calculating the actuator driving time TV in accordance with the relation TV=Y+W with the response constant W of the actuator set by the setting means.

The decision means decides whether or not the decelerating control amount to the actuator is less than a given amount and the decelerating control time is continuous more than the given time thereof during vehicle speed controlling, or the accelerating control time is continuing longer than the given time thereof, and the setting means sets the response constant W to be the basic value after elasping the given time in case where the decision means decides that the decelerating control amount to the actuator is less than a given amount and the decelerating control time is continuing longer than the given time thereof druing vehicle speed controlling, or the accelerating control time is continuing longer than the given time thereof. The decision means decides whether or not the actual vehicle speed is less than the memorized vehicle speed and the setting means sets the response constant W to be the basic value in case where the actual vehicle speed is decided to be less than the memorized vehicle speed by the decision means.

DETAILED EXPLANATION OF THE PREFERRED EMBODIMENTS

Figure 1:
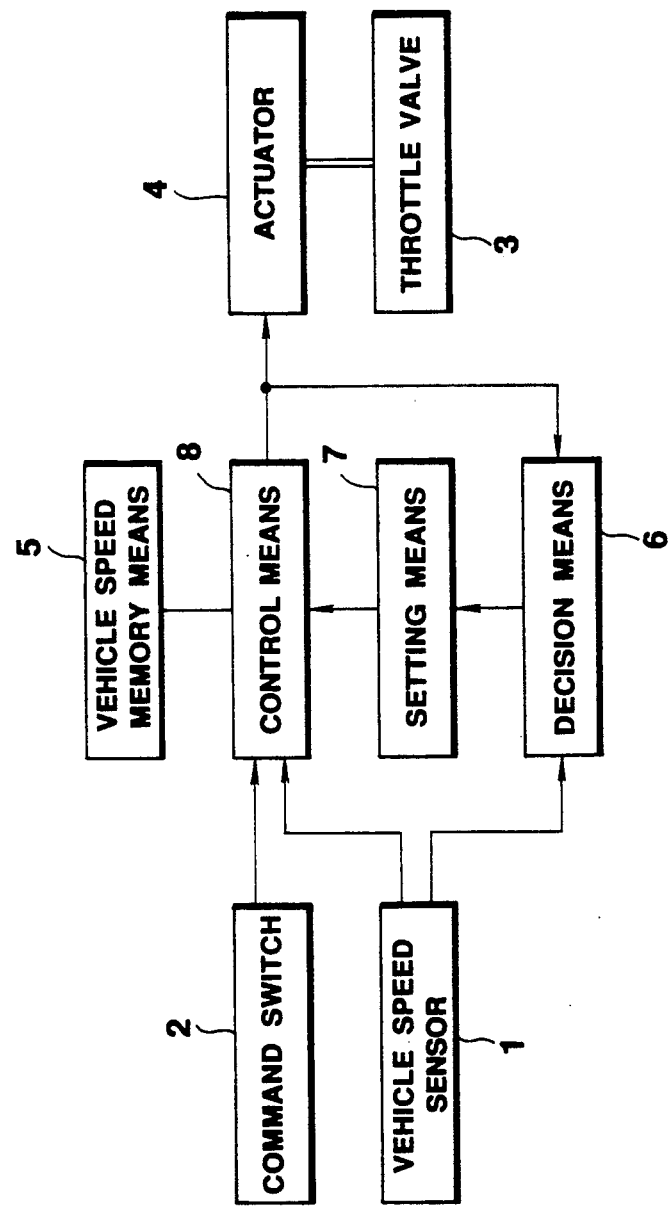
FIG. 1 is functional block diagram showing a basic construction of an automatic vehicle speed control device according to the present invention.

Now to the drawing, there is shown one embodiment of an automatic vehicle speed control device according to the present invention.

As shown in FIG. 1, the automatic vehicle speed control device according to the present invention comprises a vehicle speed sensor 1 for outputting vehicle speed data proportional to an actual vehicle speed, a command switch 2 for outputting cruise command signals, an actuator 4 for driving a throttle valve 3, a vehicle speed memory means 5 for memorizing said vehicle speed data from the vehicle speed sensor 1 in accordance with operation of the command switch 2, a decision means 6 for deciding whether or not the decelerating control amount to the actuator 4 is less than a given amount and the decelerating control time is continuing longer than the given time thereof during vehicle speed controlling, a setting means 7 for setting a response constant W of the actuator 4 larger than a initial value (reference value) by a offset value in case where the decision means 6 decides that the decelerating control amount to the actuator 4 is less than a given amount and the decelerating control time is continuing longer than the given time thereof, and a control means 8 for controlling an actuator 4 by calculating an output time Y of an actuator driving signal on the basis of the difference between the actual vehicle speed and the memorized vehicle speed, and calculating the actuator driving time TV in accordance with the relation $TV = Y + W$ with the response constant W of the actuator set by the setting means 7, so that the difference in performance of manufacture of the actuator 4 is absorbed, thereby obtaining a deceleration of minimal vehicle speed difference, and thus the actual vehicle speed and the memorized vehicle speed may be made correspondent with each other.

In an example of the automatic vehicle speed control device, the decision means 6 decides whether or not the decelerating control amount to the actuator 4 is less than a given amount and the decelerating control time is continuing longer than the given time thereof during vehicle speed controlling, or the accelerating control time is continuing longer than the given time thereof, and the setting means 7 sets the response constant W to be the initial value or reference value after the given time in case where the decelerating control amount to the actuator 4 is decided to be less than a given amount and the decelerating control time is continuing longer than the given time thereof during vehicle speed controlling, or the accelerating control time is continuing longer than the given time thereof by the decision means 6, so that the vehicle speed other than the minimal vehicle speed difference may be decelerated or accelerated, and thus the actual vehicle speed and the memorized vehicle speed may be made coincident with each other.

In another example of the automatic vehicle speed control device, the decision means 6 decides whether or not the actual vehicle speed is less than the memorized vehicle speed and the setting means 7 sets the response constant W to be the initial value or reference value in case where the actual vehicle speed is decided to be less than the memorized vehicle speed by the decision means 6, so that the actual vehicle speed and the memorized vehicle speed may be made correspondent to each other by compensating for the difference therebetween with acceleration.

Figure 2:
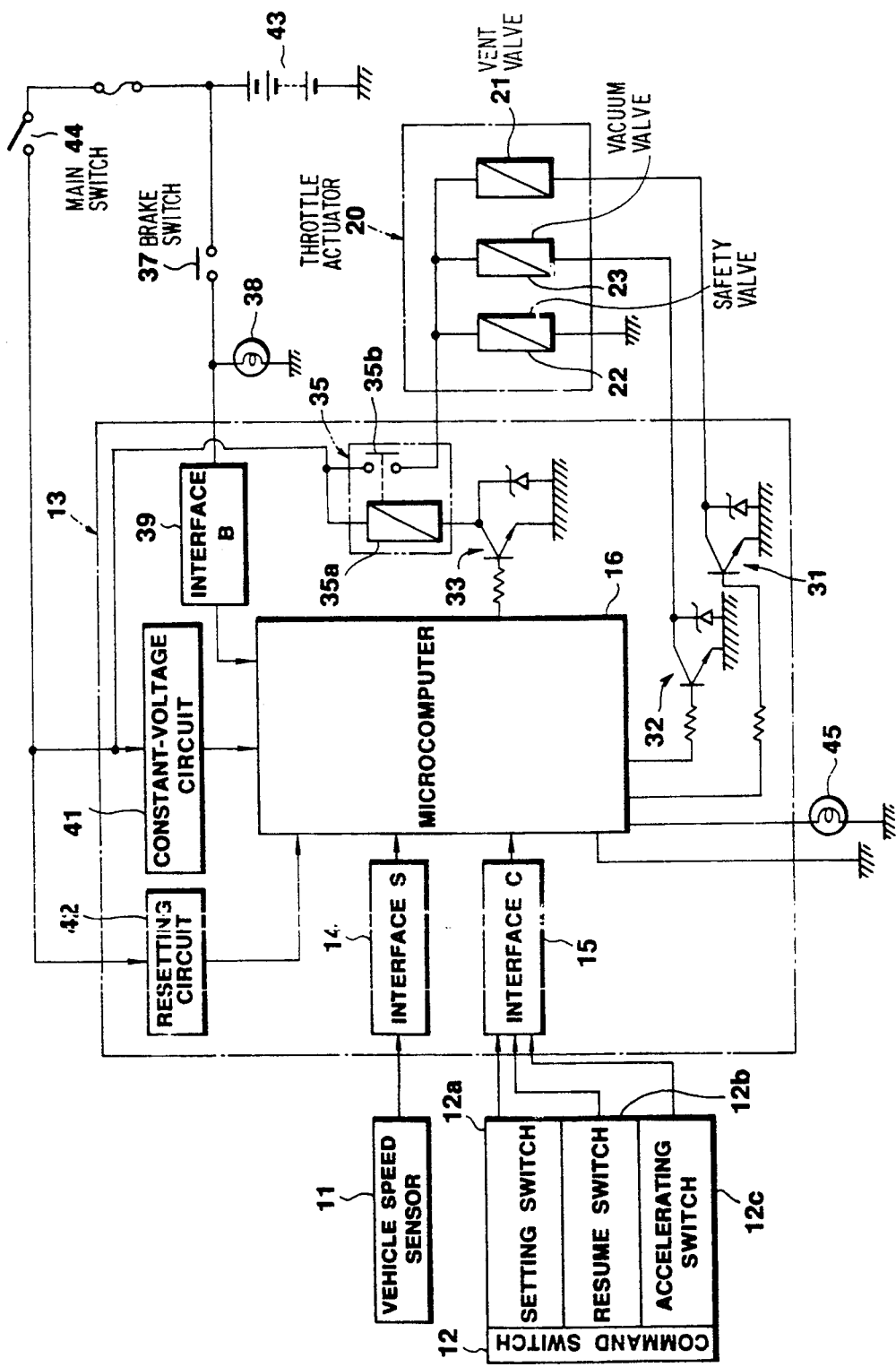
FIG. 2 is an explanatory view showing a circuit construction of one embodiment of the automatic vehicle speed device according to the present invention.
Figure 3:
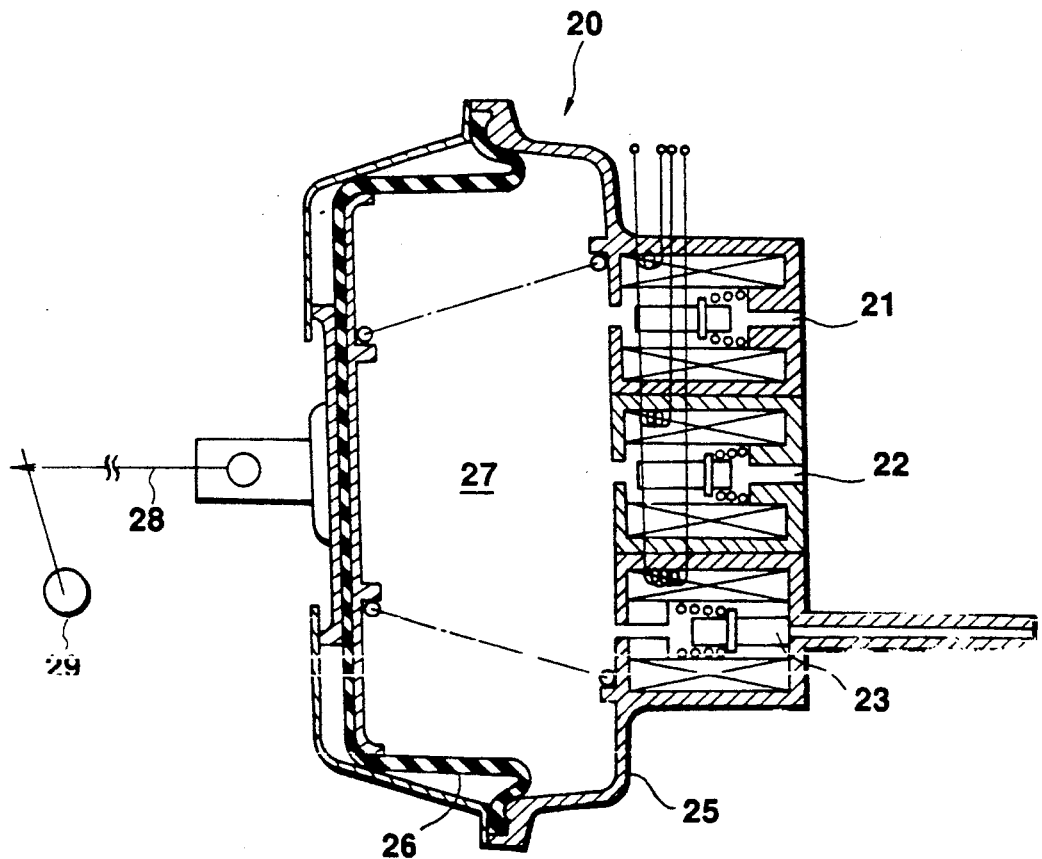
FIG. 3 is a sectional view showing the construction of an actuator shown in FIG. 2, and FIG. 4(A) and FIG. 4(B) are as flow chart showing programs provided in a microcomputer shown in FIG. 2.

FIGS. 2 to 4 show one embodiment of the automatic vehicle speed control device according to the present invention.

In FIG. 2, reference numeral 11 is a vehicle speed sensor for outputting vehicle speed data proportional to an actual vehicle speed (corresponding to the vehicle speed sensor 1 shown in FIG. 1) and reference numeral 12 is a command switch for outputting cruise command signals (corresponding to the command switch 2 shown in FIG. 1). The command switch 12 comprises a setting switch 12a, a resume switch 12b and an accelerating switch 12c. The output of the vehicle speed sensor 11 and the command switch 12 are supplied to a microcomputer 16 provided in a controller 13 through an interface 14 and an interface 15 provided in the controller 13, respectively. The microcomputer 16 comprises vehicle speed memory means (corresponding to vehicle speed memory means 5 shown in FIG. 1) for storing or memorizing vehicle speed (actual vehicle speed) obtained at switching OFF operation in response to the switching OFF operation after switching ON operation of the setting switch 12a of the command switch 12, by vehicle speed data (the number of pulse) outputted from the vehicle speed sensor 11, a decision means (corresponding to the decision means 6 shown in FIG. 1) for deciding whether or not the control amount of a vent valve 21 of an actuator 20 is less than a given amount and its control time is continuing longer than the given time thereof at decelerating control during vehicle speed controlling, or whether or not the control amount of a vent valve 21 of an actuator 20 is more than a given amount and its control time is continuing longer than the given time thereof at decelerating control during vehicle speed controlling, or whether or not the control time of a vacuum valve 23 of the actuator 20 is continuing longer than the given time or the actual vehicle speed is less than the memorized vehicle speed at the accelerating control under the vehicle speed controlling, a setting means (corresponding to the setting means 6) for setting a response constant W of the vent valve 21 of the actuator 20 to a value larger than the initial value or reference value by a offset value X according to the decided result of the decision means or for setting the response constant to the basic value after elapsing the given time or immediately, and a control means (corresponding to the control means for controlling the actuator 20 by calculating the output time Y of the actuator driving signals in accordance with the difference between the actual vehicle speed and the stored vehicle speed and calculating the actuator driving time TV in accordance with the relation $TV = Y + W$ with the response constant W of the vent value 21 of the actuator 20 set by the setting means.

The actuator 20 (corresponding to the actuator 4 shown in FIG. 1) comprises, as shown in FIG. 3, the vent valve 21 for introducing air in a negative pressure chamber 27 in the valve "open" condition at non-current supplying thereto, a safety valve 22 for introducing air in the negative pressure chamber 27 in the valve "open" condition at non-current supplying such as cancelling time, and a vacuum valve 23 for introducing negative pressure in the negative pressure chamber 27 in the valve "open" condition at current supplying, one end of each of the vent valve 21 and the safety valve 22 is opened in the atmospheric air and one end of the vacuum valve 23 is connected to an intake mainfold (negative pressure source). The other end of respective values 21, 22, 23 are connected with the negative pressure chamber 27 which is formed by a casing 25 and the side surface (right surface in FIG. 3) of a diaphragm 26. The other side of the surface (left side surface in FIG. 3) of the diaphram 26 is connected to one end of a control wire 28 and the other end of the control wire 28 is connected to a throttle valve shaft 29 for driving the throttle valve (not shown and corresponding to the throttle valve 3 shown in FIG. 1).

Reference numeral 31 (FIG. 2) is a switching section for the vent valve, which is provided in the controller 13 to ON.OFF-control the vent valve 21 by means of the output of the microcomputer 16. Reference numeral 32 is a switching section for the vacuum valve, which is provided in the controller 13 to ON.OFF-control the vacuum valve 23 by means of the output of the microcomputer 16. Reference numeral 33 is a switching section for the actuator which is provided in the controller 13 to ON.OFF-control, the power supplying for the actuator 20 in accordance with the output of the microcomputer 16. In this case, ON OFF operation to the power supplying is performed by a relay 35 having a relay coil 35a and a relay switch 35b.

Reference numeral 37 is a brake switch and reference numeral 38 is a brake lamp. The switch and lamp are so constructed that in the case of brake operation a control signal for cancelling the system is supplied to the micrcocomputer 16 through an interface 39 in the controller 13.

Reference numeral 41 is a constant voltage regulating circuit, numeral 42 is a resetting circuit, number 43 is a power supply source, numeral 44 is a main switch for control device and numeral 45 is a cruise lamp.

The operation of the automatic vehicle speed control device thus constructed is explained with reference to FIGS. 2 and 3 and FIG. 4 as follows.

In order to operate the automatic vehicle speed control device, at first, the main switch 44 is operated to the ON state. In this case, the vehicle speed sensor 11 generates pulse signals vehicle speed data proportional to the actual vehicle speed and these pulse signals are supplied to the microcomputer 16 in the controller 13 to take samples regularly, so that the microcomputer 16 always recognizes the number of pulses of the samples which are proportional to the vehicle speed. Under this condition, when the setting switch 12a is changed to the ON state to supply the setting signal to the microcomputer 16 and then the setting switch 12a is changed to the OFF state to relese the setting signal, the cruise lamp 45 is lighted up, and then the microcomputer 16 makes the actuator switching section 33 ON conditioned to render the relays 35 energized, and makes the vent valve switching section 31 ON conditioned to render the vent valve 21 and the safety valve 22 valve "close" conditioned from valve "open" state thereby shutting off the introduction of the atmospheric air into the negative pressure chamber 27. At the same time, the setting initialization corresponding to the vehicle speed at the OFF operation of the setting switch 12a makes the vacuum valve switching section 32 ON conditioned to render the vacuum valve 23 valve "open" conditioned from the valve "close" state, thereby introducing negative pressure into the negative pressure chamber 27 and driving the throttle valve shaft 29 in the valve "open" direction through the control wire 28. When the outputting time Y due to the setting initialization on the basis of the difference between the actual vehicle speed and the stored vehicle speed calculated by the microcomputer 16 is passed the vacuum valve switching section 32 becomes OFF state to render the vacuum valve 23 valve "colse" conditioned, thereby shutting off the introduction of negative pressure into the negative pressure chamber 27 and holding the throttle valve shaft 29 at the given position, resulting in a constant speed running.

In such a constant speed running condition, a program shown in FIGS. 4 (A) and 4 (B) is performed.

As in the above explanation, at a step 101, the following operations, the read-in of current vehicle speed (actual vehicle speed) by detection of pulse signals outputted from the vehicle speed sensor 11, acceptance of respective operating switches 12a, 12b, 12c of the command switch 12, and outputting of drive signal for actuator 20, are controlled, that is, ON OFF control of the vent valve 21 and the vacuum valve 23 is performed.

At the step 102, the calculation of the vehicle speed is performed for every sampling of pulse signals read at the step 101.

At a stept 103, whether or not FLAG a is "1" is decided, that is whether or not the control is shifted to the acceleration control during minimal deceleration. In case where FLAG a is decided to be "1" (YES), at a step 104 it is decided whether or not a timer provided in the microcomputer 16 elapsed by a given time, that is, the given time is passed after the control is shifted to the acceleration control from the minimal deceleration.

At the step 104, if it is decided that the timer elapsed the given time (YES), at a step 105, VENT RESPONSE (vent valve response constant) is set to a initial value or reference valve, the offset value X is set "0" (clear) and respective FLAG, timer are made clear ("0").

At the step 103, if it is decided that FLAG a is not "1" (NO), that is, if the control is not shifted to the acceleration control during the minimal deceleration, the program jumps or skips steps 104 and 105.

At the step 104, if it is decided that the timer does not elapse a given time (NO), then the program jumps the step 105.

At a step 106, it is decided whether or not the actual vehicle speed and the stored vehicle speed are coincident with each other. If it is decided that the actual vehicle speed and the stored vehicle speed correspond to each other (YES), at a step 107, it is decided whether or not FLAG b is "1". That is, it is decided whether or not the control is in the minimal deceleration condition.

At the step 107, if it is decided that FLAG b is "1" (YES), it is assumed that the actual vehicle speed, and the stored vehicle speed, are coincident with each other due to the minimal deceleration, and at a step 108, FLAG a is set to "1".

At the step 106, if it is decided that the actual vehicle speed and the stored vehicle speed are not coincident with each other (NO), it is assumed that the control is in the acceleration control condition or in the deceleration control condition and the program jumps the steps 107 and 108.

At a step 109, it is decided whether or not the actual vehicle speed is smaller than the stored vehicle speed. If it is decided that tha actual vehicle speed is smaller than the stored vehicle speed (YES), it is assumed that the control is in the acceleration control condition, and at a step 110, VENT RESPONSE is set to the initial value or reference value, the offset value X is set "0" (clear) and respective FLAG, timer are made clear ("0") as in the step 105.

At the step 109, if it is decided that the actual vehicle speed is not smaller than the stored vehicle speed (NO), it is assumed that the control is not in the acceleration control condition, and the program jumps the step 110.

At a step 111, the outputting time Y for the actuator driving signals is calculated, according to the vehicle speed calculation at the step 102, and at a step 112, it is decided whether or not the current output is the vacuum output, that is, whether or not the control is in the acceleration control condition in which the vacuum valve switching section 32 is changed to ON state with the actuator driving signal outputting time Y calculated at the step 111 to energize the vacuum valve 23 to obtain the valve "open" condition, thereby introducing the negative pressure into the negative pressure chamber 27.

At the step 112, if it is decided that the vacuum output is present, that is, the control is in the acceleration control condition (YES), at a step 113, it is decided whether or not FLAG a is "1", that is, whether or not, the previous control is in the acceleration control condition. At the step 113, if it is decided that FLAG a is not "1" (NO), it is assumed that the previous control is not in the acceleration control condition, and at a step 114, it is decided whether or not the vacuum output is continuing longer than the given time.

At the step 114, if it is decided that the vacuum output is continuing longer than the given time (YES), at a step 115, it is decided whether or not FLAG b is "1", that is, whether or not the control is shifted from the minimal deceleration condition to the acceleration control condition. If it is decided that FLAG b is "1" (YES), at a step 116, FLAG a is set to "1".

At the step 115, if it is decided that FLAG b is not "1" (NO), it is assumed that the control is in the acceleration control condition, and at a step 117, VENT RESPONSE is set to the initial value or reference value, the offset value X is set "0" (clear) and respective FLAG, timer are made clear ("0").

At the step 113, if it is decided that FLAG a is "1" (YES), it is assumed that the previous control is in the acceleration control condition, and the program jumps the steps 114, 115, 116.

At the step 114, it is decided that the vacuum output is not continuing longer than the given time (NO), it is assummed that the timer does not elapse over the given time after the control is shifted from the minimal deceleration condition to the acceleration condition, and the program jumps the steps 115, 116.

At a step 118, the response constant W of the actuator 20 is set to the vacuum valve response constant (VAC RESPONSE).

At the step 112, if it is decided the vacuum output is not present, that is the control is in the deceleration condition in which the vent valve 21 is not energized under the deceleration control during the actuator drive signal outputting time Y to obtain the valve "open" condition, thereby introducing the atmospheric air into the negative pressure chamber 27 of the actuator 20 (NO), at a step 120, it is decided whether or not FLAG b is "1", that is whether or not the control is in the minimal deceleration condition. At the step 120, if it is decided that FLAG b is not "1" (NO), that is, if the control is not in the minimal deceleration condition at a step 121, the vent valve response constant (VENT RESPONSE) is set to th initial value reference value. At the step 120, if it is decided that FLAG b is "1" (YES), that is, if it is decided that the control is in the minimal deceleration, at a step 122, the vent valve response constant (VENT RESPONSE) is set to the initial value or reference value plus the offset value X.

At a step 123, the vent valve response constant (VENT RESPONSE) set at either the step 121 or the step 122 is set to the response constant W of the actuator 20.

At a step 125, the actuator drive time TV is calculated with the relation TV=Y+W from the actuator drive signal outputting time Y calculated at the step 111 and the response constant W of the actuator 20 set at the step 118 or the response constant W of the actuator 20 set at the step 123.

At a step 126, it is decided whether or not FLAG a is "1". If it is decided that FLAG a is not "1" (NO), at a step 127, it is decided whether or not the actuator drive time TV calculated at the step 125 is the vacuum output.

At the step 127, if it is decided that the actuator drive time is the vacuum output (YES), the vacuum valve 23 is energized by the actuator drive signal TV calculated at the step 125 through the vacuum valve switching section 32 to obtain the valve "open" condition, thereby introducing the negative pressure into the negative pressure chamber 27, so that the throttle valve shaft 29 is driven in the throttle "open" direction.

At the step 127, if it is decided that the actuator drive time is not the vacuum output (NO), at a step 128, the vent output, that is, the vent valve switching section 31 is changed to OFF condition and the vent valve 21 is not energized to obtain the valve "open" condition, so that the atmospheric air is introduced into the negative pressure chamber 27 and thus the throttle valve shaft 29 is driven in the throttle "close" direction. In this case, it is decided whether or not the thus obtained driven amount is less than the given amount, that is, the control is in the minimal deceleration condition. If it is decided that the vent output is less than the given amount (YES), at a step 129, it is decided whether or not the vent output is continuing longer than the time after the given offset value X becomes the current value.

At the step 129, if it is decided that the vent output is not continuing longer than tha given time after the offset value X become the current value (NO), at the step 101, the vent valve switching section 31 changed to OFF condition by the actuator driving time TV set at the step 125 and thus the vent valve 21 of the actuator 20 is deenergized to obtain the valve "open" state, thereby introducing the atmospheric air into the negative pressure chamber 27, so that the throttle valve shaft 29 is driven in the throttle "close" direction.

At the step 129, it is decided that the vent output is continuing longer than the given time after the given value X becomes he current value (YES), at a step 130, the offset value X becomes the current offset value X plus α. In this case, FLAG b is set "1" at the step 130.

That is, when the minimal deceleration can not be performed even through the vent output is continuing longer than the given time after the vent output has become the current value in case where the offset value X is added to the initial value or reference value by the VENT RESPONSE at the time of the minimal deceleration the actual vehicle speed subjected to the minimal deceleration control is made coincident with the stored vehicle speed by adding α to the offset value X. The adding process of α to the given offset value X X is repeated until the minimal deceleration is performed.

At the step 128, if it is decided that the vent output is not less than the given amount, that is, if it is not the minimal deceleration condition (NO), at a step 135, it is decided whether or not FLAG b is "1". That is, it is decided whether or not the actual vehicle speed is more than the stored vehicle speed at the deceleration. If it is decided that FLAG b is "1" at the step 135 (YES), it is assumed that the vent output is in the minimal deceleration state and then it is decided whether or not the vent output is continuing longer than the given time at a step 136.

At the step 136, if it is decided that the vent output is continuing longer than the given time (YES), it is assumed that the actual vehicle speed is more than than stored vehicle speed, at a step 137, FLAG a is set to "1", and then at the step 101, the vent valve switching section 31 is changed to OFF state by the actuator drive time TV calculated at the step 125 and thus the vent valve 21 of the actuator 20 is deenergized to obtain the valve "open" state, thereby introducing the atomospheric air into the negative pressure chamber 27, so that the throttle valve shaft 29 is driven in the throttle "close" direction.

If the vent output is more than the given amount at the minimal deceleration, therefore, and when the timer of the microcomputer 16 has elapsed the given time at the step 104, at the step 105, VENT RESPONSE is set to the inital value or reference value, the offset value X is set to "0" (clear), and the FLAG and timer are made clear ("0"), so that under this condition, the vent valve 21 of the actuator 20 corresponds to the valve "open" condition and thus the minimal vehicle speed difference is compensated as soon as possible with deceleration operation to coincide the actual vehicle speed with the stored vehicle speed.

If it is decided that FLAG b is not "1" at the step 135 (NO), it is assumed that the control is not in the minimal deceleration condition, at a step 138, VENT RESPONSE is set to the initial value or reference value, the offset value X is set to "0" (clear) and the FLAG, and timer are made clear ("0") as in the step 105, so that the program backs to the step 101.

If it is decided that the vent output is not continuing longer than the given time at the step 136 (NO), moreover, at the step 101, the vent valve 21 of the actuator 20 is changed to the valve "open" state by the actuator drive time TV calculated at the step 125.

Under the deceleration control during the vehicle speed controlling, the vent valve 21 is controlled to obtain the valve "open" state by adding the given value X to the initial value or reference value of the response constant of the vent valve 21, and then if the minimal vehicle speed difference can not be decelerated by the set offset value X, α is added to the offset value X, thereby decelerating the minimal vehicle speed difference, so that the actual vehicle speed may be made coincident with the stored vehicle speed.

During control of the minimal vehicle speed difference, moreover, if the output control amount of the vent valve 21 is more than the given amount and its output control time is continuing longer than the given time, or if the output control time of the vacuum valve 23 is continuing longer than the given time, the vent valve response constant (VENT RESPONSE) is set to the initial value or reference value after elapsing the given time, and if the actual vehicle speed is less than the stored vehicle speed, the vent valve response constant (VENT RESPONSE) is set to the initial value or reference value immediately, so that an overshoot condition and an undershoot condition may be prevented and thus the vehicle speed control may be preferably effected.

In the above embodiments, the actuator 20 of negative pressure control system is explained as an example, actuators, positive pressure control system, negative pressure pump system and motor drive system are utilized in the automatic vehicle speed control device according to the present invention.

What is claimed is:

1. An automatic speed control device for a vehicle, comprising:

vehicle sensor means for sensing an actual speed of the vehicle, and for generating actual speed data which is proportional to the actual speed of the vehicle;

command switch means operable for generating a cruise command signal;

throttle valve means for controlling a speed of the vehicle;

actuator means for driving said throttle valve means;

memory means for storing a desired speed datum generated by said vehicle speed sensor means in response to the cruise command signal from said command switch means;

control means responsive to the actual speed data from said vehicle speed sensor means and the cruise command signal from said cruise command switch means, for generating a control signal for controlling said actuator means, the control signal including a first characteristic which varies in response to a difference between the actual speed data from said vehicle speed sensor means and the desired speed datum stored in said memory means, and a second characteristic which is a function of a reference value corresponding to a response constant of said actuator means;

decision means having first detecting means for detecting the control signal from said control means and for providing a first decision signal if an amount of the control signal from said control means is less than a first predetermined amount and a duration of the control signal is longer than a first determined time duration; and setting means responsive to the first decision signal from the first detecting means of said decision means and operable for adding an offset value to the reference value of the second characteristic of the control signal of said control means.

2. The automatic speed control device as defined in claim 1, wherein said decision means further comprises second detecting means for detecting the control signal from said control means and for providing a second decision signal if the amount of the control signal of said control means is greater than a second predetermined amount and the duration of the control signal is longer than a second predetermined time duration, and wherein said setting means is responsive to the provided second decision signal and is operable for restoring the second characteristic of the control signal of said control means to the reference value.

3. The automatic speed control device as defined in claim 1, wherein said decision means further comprises third detecting means for detecting the control signal from said control means and for providing a third decision signal if the control signal is an acceleration signal to accelerate the vehicle and if the control signal has a duration which is longer than a third predetermined time duration, and wherein said setting means is responsive to the third decision signal and is operable for restoring the second characteristic of the control signal to the reference value.

4. The automatic speed control device as defined in claim 1, wherein said decision means further comprises comparator means for comparing the actual speed data from said vehicle speed sensor means with the desired speed datum stored in said memory means, and said decision means provides a fourth decision signal if the actual speed data from said vehicle speed sensor means is less than the desired speed datum stored in said memory means, and wherein said setting means is responsive to the provided fourth decision signal and is operable for immediately restoring the second characteristic of the control signal of said control means to the reference value.

5. An automatic speed control device for a vehicle, comprising:
vehicle speed sensor means for sensing an actual speed of the vehicle, and for generating actual speed data which is proportional to an actual speed of the vehicle;
command switch means operable for generating a cruise command signal;
throttle valve means for controlling a speed of the vehicle;
actuator means operatively connected to said throttle valve means and having a vacuum valve and a vent valve for driving said throttle valve means;
memory means for storing a desired speed datum generated by said vehicle speed sensor means in response to the cruise command signal generated from said command switch means;
control means responsive to the actual speed data from said vehicle speed sensor means and the cruise command signal from said cruise command switch means, and for generating a control signal for controlling said actuator means, the control signal including a first characteristic which is varied in response to a difference between the actual speed data from said vehicle speed sensor means and the desired speed datum stored in said memory means, and including a second characteristic which is a function of a predetermined initial value corresponding to a response constant of said vent valve of said actuator means;
decision means having first detecting means for detecting the control signal from said control means and for providing a first decision signal if an amount of the control signal is less than a first predetermined amount and if a duration of the control signal is longer than a first determined time duration; and
setting means responsive to the first decision signal and operable for adding an offset value to a predetermined initial value of the second characteristic of the control signal.

6. The automatic speed control device as defined in claim 5, wherein said decision means further comprises second detecting means for detecting the control signal from said control means and for providing a second decision signal if the amount of the control signal of said control means is greater than a second predetermined amount and the duration of the control signal is longer than a second predetermined time duration, and wherein said setting means is responsive to the second decision signal from the second detecting means and is operable for restoring the second characteristic of the control signal to the predetermined initial value.

7. The automatic speed control device as defined in claim 5, wherein said decision means further comprises third detecting means for detecting the control signal from said control means and for providing a third decision signal if the control signal is an acceleration signal to be supplied to said vacuum valve of said actuator means and if the control signal has a duration longer than a third predetermined time duration, and wherein said setting means is responsive to the third decision signal from the third detecting means and is operable for restoring the second characteristic of the control signal to the predetermined initial value.

8. The automatic speed control device as defined in claim 5, wherein said decision means further comprises comparator means for comparing the actual speed data from said vehicle speed sensor means with the desired speed datum stored in said memory means, and said decision means provides a fourth decision signal if the actual speed data from said vehicle speed sensor means is less than the desired speed datum stored in said memory means, and wherein said setting means is responsive to the fourth decision signal from said decision means and is operable for immediately restoring the second characteristic of the control signal to the predetermined initial value.

* * * * *